United States Patent
Balasubramanian

(10) Patent No.: US 12,340,370 B1
(45) Date of Patent: Jun. 24, 2025

(54) METHODS AND SYSTEMS FOR MULTI-FACTOR AUTHENTICATION

(71) Applicant: Stripe, Inc., South San Francisco, CA (US)

(72) Inventor: Girish Balasubramanian, Fremont, CA (US)

(73) Assignee: Stripe, Inc., Sacramento, CA (US)

( * ) Notice: Subject to any disclaimer, the term of this patent is extended or adjusted under 35 U.S.C. 154(b) by 0 days.

(21) Appl. No.: 18/639,888

(22) Filed: Apr. 18, 2024

Related U.S. Application Data

(63) Continuation of application No. 16/677,393, filed on Nov. 7, 2019, now abandoned.

(51) Int. Cl.
*G06Q 20/40* (2012.01)

(52) U.S. Cl.
CPC .............................. *G06Q 20/4014* (2013.01)

(58) Field of Classification Search
CPC .................................................. G06Q 20/4014
See application file for complete search history.

(56) References Cited

U.S. PATENT DOCUMENTS

| | | | | |
|---|---|---|---|---|
| 2007/0022301 A1* | 1/2007 | Nicholson | .......... | G06Q 20/4014 713/184 |
| 2010/0332832 A1* | 12/2010 | Wu | .......... | H04L 9/321 713/169 |
| 2012/0110341 A1* | 5/2012 | Beigi | .......... | H04W 12/069 713/186 |
| 2013/0179350 A1* | 7/2013 | Kirillin | .......... | G06Q 40/02 705/64 |
| 2022/0191198 A1* | 6/2022 | Piel | .......... | G06Q 20/401 |

* cited by examiner

*Primary Examiner* — Peter D Nolan
*Assistant Examiner* — Matthew Cobb
(74) *Attorney, Agent, or Firm* — Foley & Lardner LLP

(57) ABSTRACT

Disclosed herein are methods and systems for multi-platform authentication of electronic devices. One method involves a processor monitoring data related to the execution of an initial authentication request for a user via a first electronic platform. Subsequently, the processor receives, via the first platform, a request to complete a second authentication request by a second electronic platform, which corresponds to a multi-factor authentication. Upon receiving a first factor authentication purportedly authenticating the identity of the user, the processor generates second factor authentication information based on the monitored data. A message containing both first and second factor authentication details is then generated and transmitted to the second electronic platform. Upon receiving a positive authentication result from the second electronic platform, confirming the user's identity authentication.

20 Claims, 6 Drawing Sheets

METHODS AND SYSTEMS FOR MULTI-FACTOR AUTHENTICATION

BACKGROUND

Both online and brick-and-mortar merchants provide their products and services to consumers. A merchant may use a commerce platform who acts as a third-party payment processor to enable merchants to accept payments from consumers. The commerce platform may operate online or in brick-and-mortar buildings. In either scenario, before a consumer may complete a transaction, the merchant, commerce platform, or the consumer's card issuer (e.g., financial institution) may need to verify the consumer's identity. Verifying the identity is sometimes referred to as authentication. When a consumer is authenticated, the merchant, commerce platform, and issuer have confidence that the desired transaction is legitimate and not fraudulent.

One type of consumer authentication may be referred to as two-factor authentication. Two-factor authentication is an authentication method in which a device (e.g., consumer device) is granted access or authorization only after successfully presenting two pieces of evidence (or factors) to an authentication system. If the two factors satisfy the requirements of the authentication system, the device is deemed to be authenticated and, in the context of electronic financial transactions, the consumer may complete a purchase on the device. Examples of two-factor authentication include Three-Domain Secure (3DS) authentication and one-time password (OTP) authentication.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
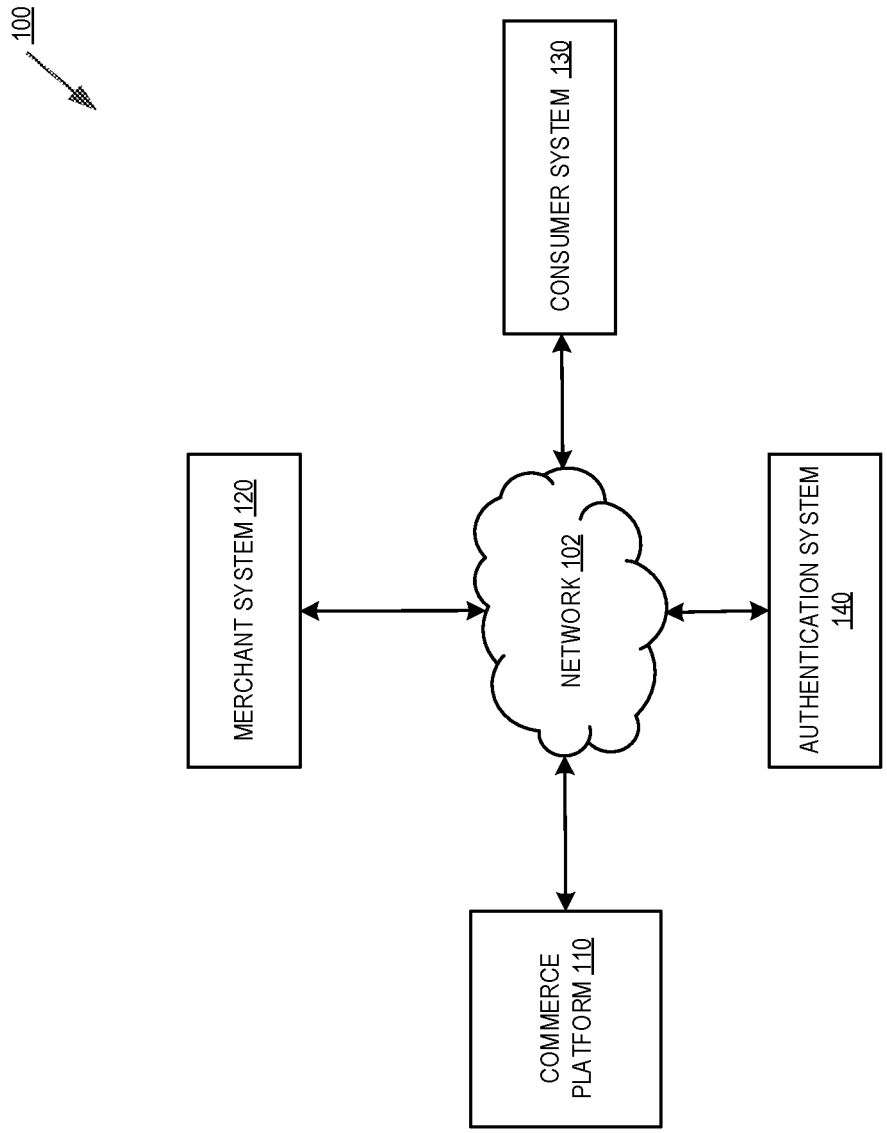
FIG. 1 is a block diagram of an exemplary system architecture for providing authenticating information to an authentication system in a secure manner.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "facilitating," "receiving," "determining," "communicating," "performing," "processing," "transmitting," "retrieving," "generating," "storing," "encrypting," "or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Due to increasing fraudulent activity in online transactions, many entities are requiring additional security measures before authorizing online transactions. One example of an additional security measure relates to authenticating a user before the consumer is allowed to perform an electronic transaction. Authentication may refer to verifying the user's identity. A user may be authenticated in a number of ways, including two-factor authentication, and three-dimensional secure authentication, among others. A common characteristic among these forms of authentication is to require the user to provide multiple pieces of information that an authentication system may use to verify that the user is legitimate and not acting fraudulently. As an example, a user may wish to make a purchase online using her laptop computer. Before purchasing, the user must first enter a username and a passcode, which are matched against existing and trusted user name and passcode pairs. This may be considered one piece of information once matched. The user may then receive a message on her device (e.g., an SMS message on her phone) that includes a one-time password. The user may then need to enter that one-time password on an interface that is displayed on her laptop. This may be considered as another piece of information when the entered password matches the one-time password sent to the user device. Generally, after two pieces (or factors) of information have been provided, the authentication system authenticates the user.

Another example of additional security measures relates to authenticating card data as being from an owner of a card (e.g., to prevent fraudulently using a credit, debit, gift, or other card). In this example, card information including card number, PAN, security code, name on card, etc. may be a first factor authentication factor. However, it may be difficult for an authentication system (e.g., a bank, card brand system, etc.) to verify the authenticity of the purchase as being from the rightful owner of the card without additional factors of authentication.

However, providing multiple factors of authentication is burdensome to users during transactions. Online merchants and other entities that facilitate online commerce observe a large number of users not completing electronic transactions during the multi-factor authentication process. This results in lost sales and lower revenues. To overcome this problem, in embodiments discussed herein, a commerce platform may provide to the authentication system the second piece of information that the authentication system requires to authenticate a user. For example, in a two-factor authentication protocol, the information may satisfy the second-factor requirement of the two-factor authentication. For example, the commerce platform may send a one-time passcode that the user had previously entered within a threshold amount of time (e.g., 1 hour) or had previously entered during the same browsing session. As another example, the commerce platform may automatically supply the second factor from data tracked and stored during prior transactions. This may satisfy the authentication system's requirement for a second factor of authentication. Additionally, the commerce platform participating in the multi-factor authentication of the consumer improves the speed and reduces latency associated with utilizing multi-factor authentication of the consumer, while maintaining guarantees of security. This not only improve the efficiency by which a consumer is authenticated during an electronic transaction, but also avoids the delays and drop-offs that are so often associated with two-factor authentication. Additionally, the commerce platform providing information to the authentication system does not compromise security. Rather, it speeds up the authentication process (e.g., improves transaction system efficiency) and avoids latency causing dropped transactions (e.g., by improving merchant system conversions). From the consumer's perspective, this may be a single factor authentication, but from an authentication system's perspective this is a multi-factor authentication with the additional security factors providing improved security and reliability.

FIG. 1 is a block diagram of an exemplary system architecture for providing authenticating information to an authentication system in a secure manner. In one embodiment, the system 100 includes one or more computer systems, such as a commerce platform 110, a merchant system 120, a consumer system 130, and an authentication system 140. In one embodiment, consumer system 130 is a mobile computing device, such as a smartphone, tablet computer, smartwatch, desktop, laptop, etc. The merchant system 120, commerce platform 110, and authentication system 140 may also be computing devices, such as one or more server computer systems, desktop computer systems, etc.

The commerce platform 110, merchant system 130, and consumer system 130 may be coupled to a network 102 and communicate with one another using any of the standard protocols for the exchange of information. In embodiments, the protocols can include secure communications protocols, such as hypertext transfer protocol secure (HTTPS), secure socket layer (SSL), transport layer security (TLS), as well as other secure communications protocols. In one embodiment, one or more of the consumer system 130, merchant system 120, and commerce platform 110 may run on one Local Area Network (LAN) and may be incorporated into the same physical or logical system, or different physical or logical systems. Alternatively, the consumer system 130, merchant system 120, and commerce platform 110 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. Furthermore, in embodiments, commerce platform 110 may interact with multiple different merchant systems and their respective customer systems, consistent with the discussion herein.

In one embodiment, merchant system 120 is responsible providing a system through which services and/or products are provided to consumers (e.g., the customers of the merchant). The merchant system 120 may, for example, provide a system through which laundry service, food delivery, transportation, personal service, etc. may be supplied to a consumer. The merchant system 120 may also be an online retail store that sells products to consumers such as electronics, clothing, or books. Such services and/or products can be provided to the consumer via a merchant website provided through merchant system 120, a mobile application developed or distributed by the merchant system 120 that enables a consumer to order merchant products and/or services, as well as other forms of providing products and services of the merchant system 120.

In embodiments, the user of consumer system 130 communicates with merchant system through a consumer mobile application (e.g., consumer application 252 of FIG. 2) executing on consumer system 130 and/or a merchant web page/application (e.g., merchant application 252 of FIG. 2) executing on merchant system 120. The merchant applications, in embodiments discussed herein, provide an interface for establishing communication between the corresponding user device and the merchant system 120 to enable the merchant to provide products or services to the consumer.

Furthermore, the consumer mobile application and merchant web page/application provide the user interface through which the user of consumer system 130 can interact with the merchant system 120.

In one embodiment, merchant system 120 does not handle financial transactions for the product and/or services which are provided by the merchant. That is, when a product or service of the merchant system 120 is provided to a consumer, the merchant system 120 does not receive consumer payment information (e.g., credit card information, digital asset information, etc.), process payments from accounts associated with the payment information, credit the merchant upon successful payment collection, etc. Instead, merchant system 120 utilizes the services of commerce platform 110 to perform the financial transactions and/or processing when a merchant system 120 service and/or product is provided to a consumer.

In one embodiment, commerce platform 110 is a distributed commerce platform that is responsible for maintaining one or more accounts for merchant system 120, such as accounts that associate merchant systems with banking systems, identify service terms between the merchant system 120 and the commerce platform 110, identify how to credit agents of a merchant, identify a fee associated with each transaction processed by commerce platform 110, etc. Commerce platform 110, in embodiments, further maintains financial accounts for merchant system 120, which are accounts that associate specific mobile devices with the users of merchant system 120.

In embodiments, the authentication system 140 may be managed by any suitable entity that is responsible for authenticating users and user devices. For example, the authentication system 140 may be a card issuer, a financial institution, a government agency, or any other suitable entity. The authentication system may serve to authenticate users and user devices in accordance with one or more statutory requirements in the relevant jurisdictions. For example, if a user desires to transfer money into an investment account, the authentication system 140 may require multiple factors of identification to ensure that the user is legitimate and that the requested action is legitimate. Such forms of identification may be a username and password, a one-time password sent to a second device of the user, facial or fingerprint scanning, security questions, or any other suitable form of identification.

In embodiments, the commerce platform 110 may facilitate improvement in multi-factor authentication for electronic transactions by automatically providing information to the authentication system that may satisfy a second-factor requirement, a third-factor requirement, etc. This may serve to transform the convenience of a single factor authentication requirement on consumer system to a more secure multi-factor authentication (without any additional effort on part of the consumer), and which improves the likelihood that the authentication system 140 will approve of electronic transactions.

Figure 2:
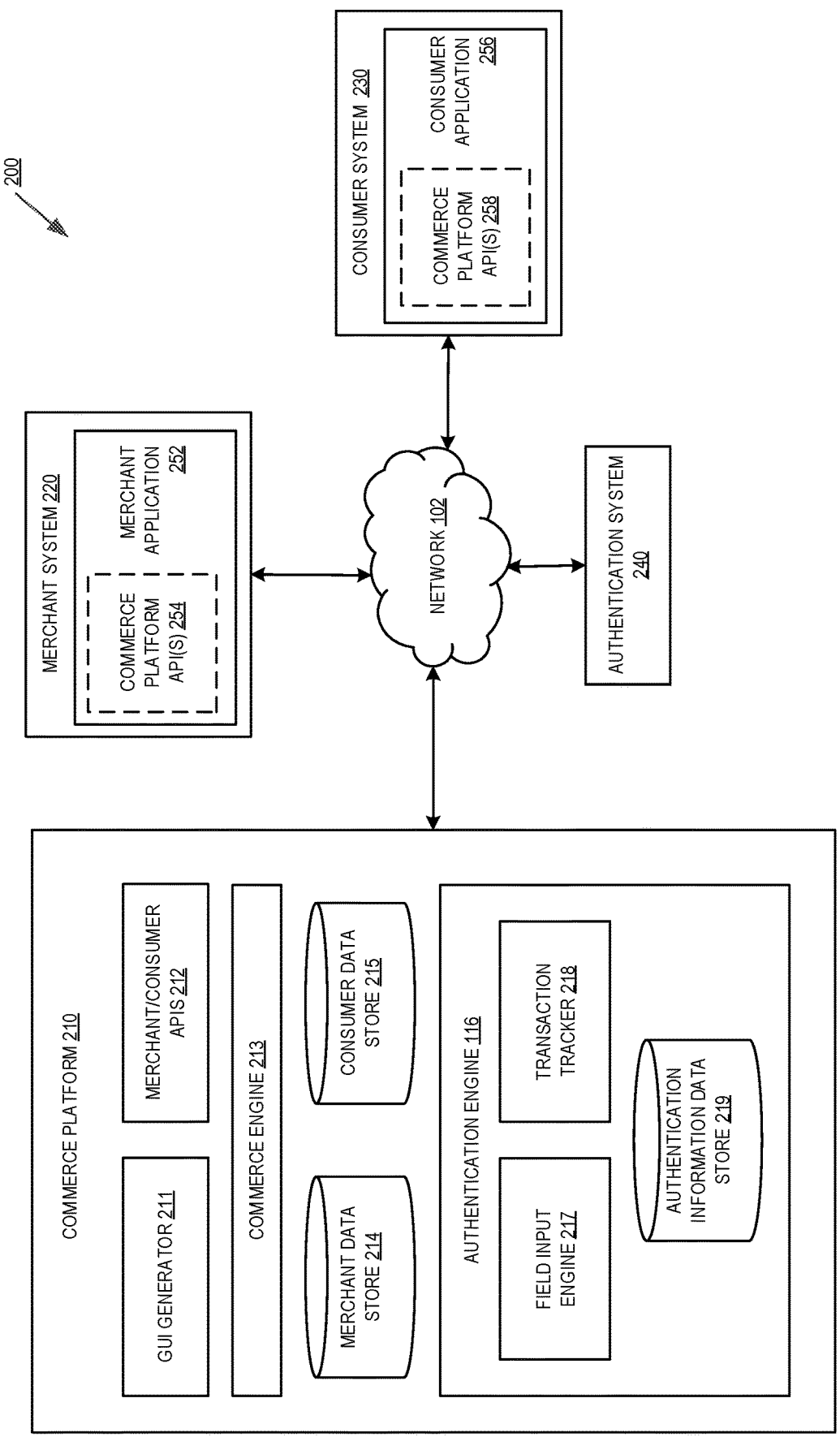
FIG. 2 is a block diagram of an exemplary system architecture including an exemplary commerce platform architecture for providing authenticating information to an authentication system in a secure manner.

FIG. 2 is a block diagram of an exemplary system architecture 200 including an exemplary commerce platform architecture for providing authenticating information to an authentication system in a secure manner. System architecture 200 may include the commerce platform 210, the merchant system 220, the consumer system 230, and the authentication system 240. The commerce platform 210, merchant system 220, consumer system 230, and the authentication system 240 provide additional details for the commerce platform 110, merchant system 120, consumer system 130, and authentication system 240 discussed above. The merchant system 220 may include a merchant application 252 and consumer system 230 may include a consumer application 256. These applications 252, 256 may enable the consumer and the merchant to exchange goods and services for payment. For example, a consumer may use a consumer application 256 to view shoes available for purchase from an online retailer. The merchant may have an analogous merchant application 252 that enables the merchant to complete transactions (e.g., accept payment, ship shoes, etc.). The merchant application 252 and the consumer application 256 may interface with the commerce platform 210 via commerce platform API(s) 254, 258.

The commerce platform 210 may include a GUI generator 211, merchant/consumer APIs 212, a commerce engine 213, a merchant data store 214, a consumer data store 215, and an authentication engine 216. The authentication engine 216 may consist of software and/or dedicated hardware and may be primarily responsible for facilitating authentication of a user to a third-party authentication system. The authentication system will be discussed in more detail below with reference to FIG. 3. The authentication engine 216 may include a field input engine 217, a transaction tracker 218, and an authentication information data store 219. The field input engine 217 may use the information in the authentication information data store 219 and the information provided by the transaction tracker 218 to populate existing messaging fields that is sent to the authentication system. The messaging fields may be any input fields of any suitable message that is sent to the authentication system. Such messaging fields may be in the form of card fields, payment fields, authorization fields, or any other suitable messaging fields that may include, for example, additional authentication factors. In some embodiments, the field input engine 217 may input a URL into a messaging field. The URL may point to a web resource that contains information related to the consumer system 230, the card used by the user of consumer system 230, or any other suitable information. Inputting a URL into the messaging field instead of the information may allow the commerce platform 210 to include more information than what is allowed by the messaging fields. In embodiments, the URL may be an expiring URL such that the URL expires and is no longer available after a predetermined period of time. In embodiments, the information referenced by the URL may be encrypted and unreadable without a proper encryption key. The field input engine 217 may include with the URL an encryption key in one of the messaging fields so that the authentication system may access the information referenced by the URL.

In particular embodiments, the transaction tracker 218 may track transactions of users of the commerce platform 210. The field input engine 217 may query the transaction tracker 218 to access information about any suitable user. As an example and not by way of limitation, a user may make three online purchases within two hours and may use the commerce platform 210 to facilitate payment. These purchases may have information associated with them, such as the time of purchase, the card used, merchant information, name, address, billing information, and other suitable information. This information may be stored by the transaction tracker 218 in the authentication information data store 219 or in another suitable location (e.g., consumer data store 215). This information may also be passed on to the authentication system by the authentication engine 216 (e.g., through messaging fields, URL, etc.). The authentication system may rely on this information to make an authentication determination. In embodiments, this information may satisfy a statutory requirement for multi-factor authentication such that the user may be authenticated via multi-factor authentication using at least in part the information supplied by the authentication engine 216.

Figure 3:
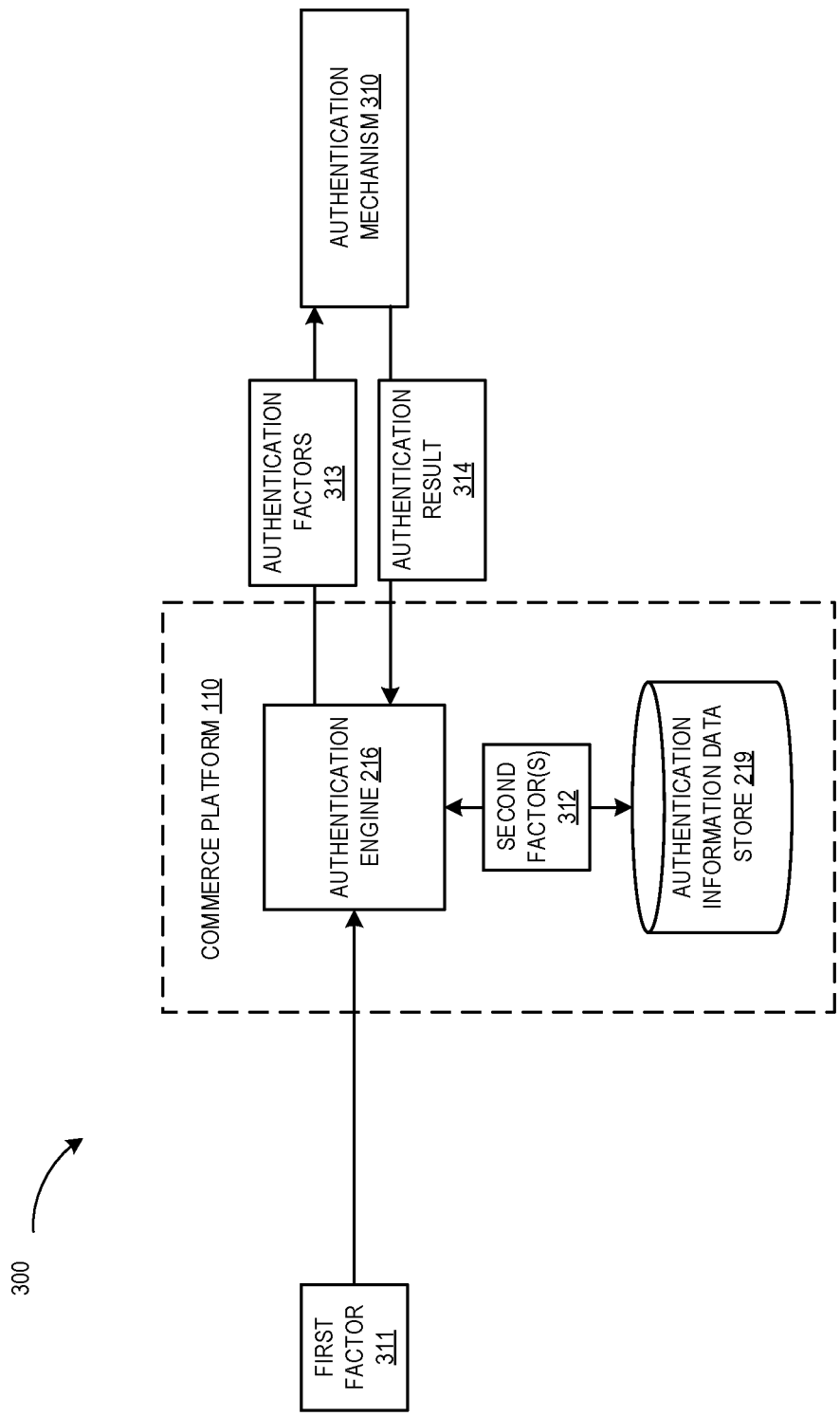
FIG. 3 is a block diagram of a system for providing two factors of authentication to an authentication system in a secure manner.

FIG. 3 is a block diagram of a system 300 for providing two factors of authentication to an authentication system in a secure manner. System 300 may include first factor 311 input in the commerce platform 110, authentication engine 216, authentication information data store 219, and authentication mechanism 310. The authentication mechanism 310 may be part of the authentication system 240 and may be associated with a third party that is responsible for authenticating users over the Internet. For example, the authentication mechanism 310 may be associated with a card issuer who issued a credit card to a user of the consumer system 230.

In a traditional multi-factor authentication protocol, the user of the consumer system 230 may be required to produce each form of authentication. These forms may include card data, a username and password, a memorized PIN number, a one-time pin, answers to various security questions (e.g., what was the name of your first girlfriend or boyfriend? What was your high school mascot?, etc.), physical characteristics (e.g., face recognition, fingerprint scan, etc.), or any other useful identifying information for use during a transaction. For example, if a user desires access to a web page or to make a purchase, the user may first need to provide the first-factor information 311 of authentication (e.g., card data, username and password, PIN associated with a card, etc.). Then the user may need to provide the second factor of authentication (e.g., one-time pin). Providing the second factor of authentication takes additional time to complete (e.g., 15 seconds to 2 minutes). Alternatively, the merchant system 220 may provide the first factor 311. In either case, this extra time causes many users to abandon the transaction or access request. In an attempt to prevent transaction abandonment while maintaining security, the commerce platform 210, e.g., via authentication engine 216, may provide additional authentication factors 313 (e.g., a second factor including identifying information). The delivery of authentication factors 313 from the authentication engine 216 may occur immediately or upon request from the authentication mechanism 310. In embodiments, the authentication factors 313 may be provided before the authentication mechanism 310 even requests them. The first factor 311 may be included in the authentication factors 313. The second factor of authentication may be retrieved from a storage location within the commerce platform 110 (e.g., the authentication information data store 219).

In embodiments, authentication mechanism 310 may request, on its own, additional factors of authentication. For example, the authentication mechanism may specify the first factor 311 and/or other identifiers (e.g., user identifier, device identifier, card data, etc.) that can be used by authentication engine 216 to look up second factor(s) 312. In this way, even if authentication mechanism 310 receives transactions from a system other than commerce platform 110, but still desires additional security, authentication mechanism 310 may request and receive second authentication factors as discussed herein.

In embodiments, the commerce platform 210 may provide the second-factor information 312 automatically, without further input from the user of consumer system 230. This way, the user is not burdened or annoyed with providing the second-factor information herself. Additionally, by the commerce platform selecting and providing the second authentication factor, which is performed in less time that would be required of the user, the speed and efficiency of the multi-factor authentication process performed with authentication engine is improved. After the authentication mechanism 310 has evaluated the information contained in the authentication factors 313 (which may include the first factor 311), the authentication mechanism may send an authentication result 314 to the commerce platform. If the authentication result 314 authenticates the user device, the request to perform the electronic transaction may be granted and the electronic transaction may be carried out.

Figure 4:
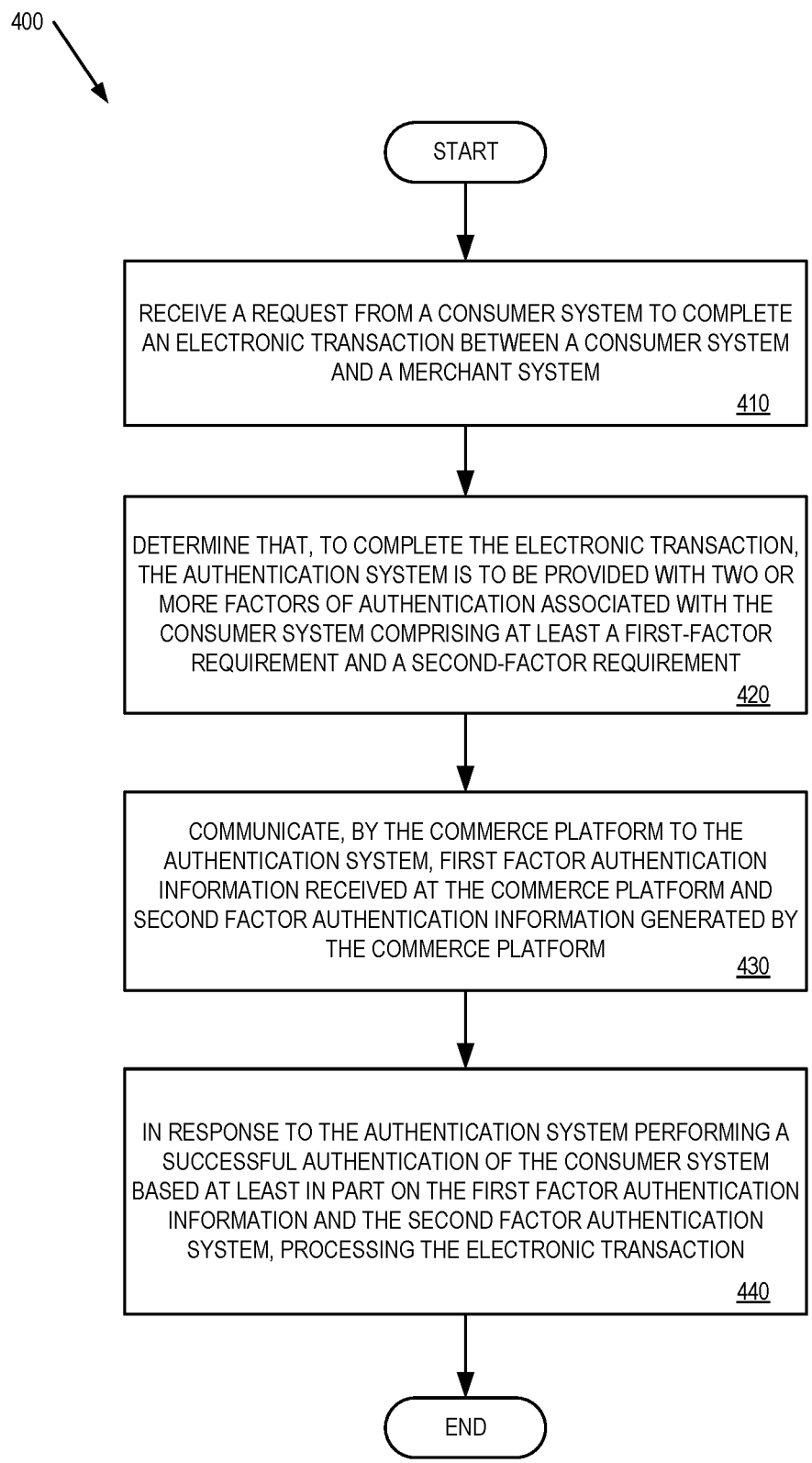
FIG. 4 is a block diagram illustrating a method of providing two factors of authentication to an authentication system in a secure manner.

FIG. 4 illustrates one embodiment of a method 400 of providing two factors of authentication to an authentication system in a secure manner. The method 400 is performed by processing logic that may comprise hardware (circuitry, dedicated logic, etc.), software (such as is run on a general-purpose computer system or a dedicated machine), firmware, or a combination thereof. In one embodiment, the method 400 is performed by one or more commerce platform server computer systems (e.g., one or more servers managed by the commerce platform 210).

Referring to FIG. 4, processing logic of the commerce platform server(s) begins by receiving, at the commerce platform, a request to complete an electronic transaction between the consumer system and a merchant system (processing block 410). The electronic transaction may be received via an input to a merchant system, such as via a web page, application mobile app, etc. Furthermore, the request may include card information (e.g., card number, PAN, security code, name on card, expiration date, etc.) for use during the electronic transaction. The processing logic determines that to complete the electronic transaction, the authentication system is to be provided with two or more factors of authentication associated with the consumer system comprising at least a first-factor requirement and a second-factor requirement (processing block 420). In an embodiment, the two or more factors may be a requirement of the authentication system. In another embodiment, the two or more factors may be supplied proactively by processing logic to increase transaction approval. The processing logic communicates to the authentication system first factor authentication information received at the commerce platform and second factor authentication information generated by the commerce platform (processing block 430). For example, the first factor of authentication may be the received information during the electronic transaction, such as the card data, username/password combination, etc. Then, in embodiments discussed herein, processing logic may utilize the information to look up or access additional information, such as a device identifier originating the transaction (e.g., an IP address originating the transaction and associated with a prior IP address used to originate a transaction, a geographic location that is the same/similar to a prior geographic location from which a transaction originated, etc.). In embodiments, this additional information may be sent to the authentication system, for example combined with the user received information. In response to the authentication system performing a successful authentication of the consumer system based at least in part on the first factor authentication information and the second factor authentication system, the processing logic processes the electronic transaction (processing block 440). For example, processing the transaction may include clearing, authorizing, or otherwise approve the transaction.

Figure 5:
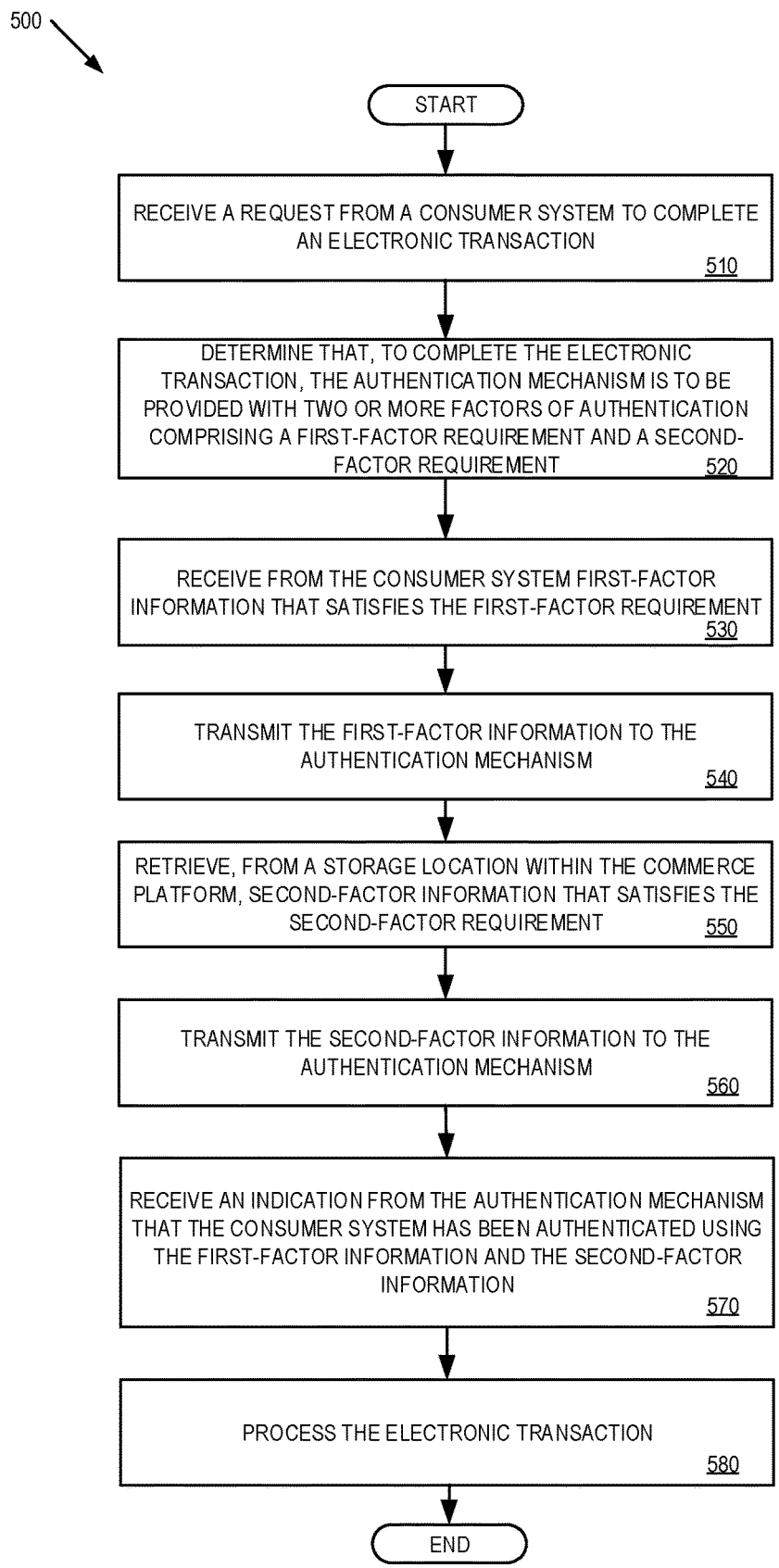
FIG. 5 is a block diagram illustrating another method of providing two factors of authentication to an authentication system in a secure manner.

FIG. 5 illustrates one embodiment of a method 500 of providing two factors of authentication to an authentication system in a secure manner. The method 400 is performed by processing logic that may comprise hardware (circuitry, dedicated logic, etc.), software (such as is run on a general-purpose computer system or a dedicated machine), firmware, or a combination thereof. In one embodiment, the method 500 is performed by one or more commerce platform server computer systems (e.g., one or more servers managed by the commerce platform 210).

Referring to FIG. 5, processing logic of the commerce platform server(s) begins by receiving a request from a consumer system to complete an electronic transaction (processing block 510). The electronic transaction may be any suitable transaction, including a purchase for goods or services, a gift or donation to another individual or entity, or a transfer of funds between accounts associated with a user of the consumer system 230 or another entity. The request to complete an electronic transaction may be directed to the commerce platform 210 to facilitate a payment exchange from the user associated with consumer system 230 to the merchant system 220. The request may be delivered through an API of the commerce platform (e.g., commerce platform API(s) 254, 258).

The processing logic determines that, to complete the electronic transaction, an authentication system requires two or more factors of authentication comprising a first-factor requirement and a second-factor requirement (processing block 520). In embodiments, the two or more factors may or may not be required by the authentication system. In embodiments, processing logic provides additional authentication factors proactively in order to increase a likelihood of transaction approval. In either embodiment, as discussed herein, the two authentication factors may comprise any suitable information used to perform multi-factor authentication. For example, the first-factor requirement may be card data, a username and password, etc. The second-factor requirement may be a one-time PIN or passcode, facial recognition, a device ID, answers to security questions, etc. The authentication system may require more than merely the first factor in order to authenticate the user. This added level of security from multi-factor authentication may be a statutory requirement based on the jurisdiction of the user, issuer, commerce platform, merchant, or any combination of these.

The processing logic receives from the consumer system first-factor information that satisfies the first-factor requirement (processing block 530). As discussed, the first-factor information may be any suitable information that satisfies the first-factor requirement (e.g., card information for use in a transaction, a username/password combination, etc.). The processing logic transmits the first-factor information to the authentication system (processing block 540).

The processing logic retrieves, from a storage location within the commerce platform, second-factor information that satisfies the second-factor requirement (processing block 550). The storage location may be any suitable storage container or location such as authentication information data store 219 or consumer data store 215. The information stored in the storage location may be any suitable information associated with the consumer system sending the request or user associated with the consumer system sending the request. As an example, the information stored in the storage location may include a one-time passcode that the user entered earlier that day, answers to security questions that the user entered previously, past transactions, account information, IP address associated with a past verified transaction, purchase patterns associated with the consumer system, etc. For example, the second-factor information may include a table of transactions previously performed by the commerce platform 210 on behalf of a user. The table of transactions may have a fixed number of columns and any suitable number of rows-one row for each transaction. The columns in the table of transactions may include card information, purchase information, device information, or any other suitable information, as well as an indication as to whether the transaction for the row was approved.

The processing logic transmits the second-factor information to the authentication system (processing block 560). The processing logic receives an indication from the authentication system that the consumer system has been authenticated using the first-factor information and the second-factor information (processing block 570). Alternatively, instead of authenticating the consumer system, the authentication system may authenticate the user of the consumer system. The authentication may be an indication that the user is legitimate and that the transaction request is legitimate. In response to receiving the indication that the authentication has been successful, the processing logic may process the electronic transaction (processing block 580).

Figure 6:
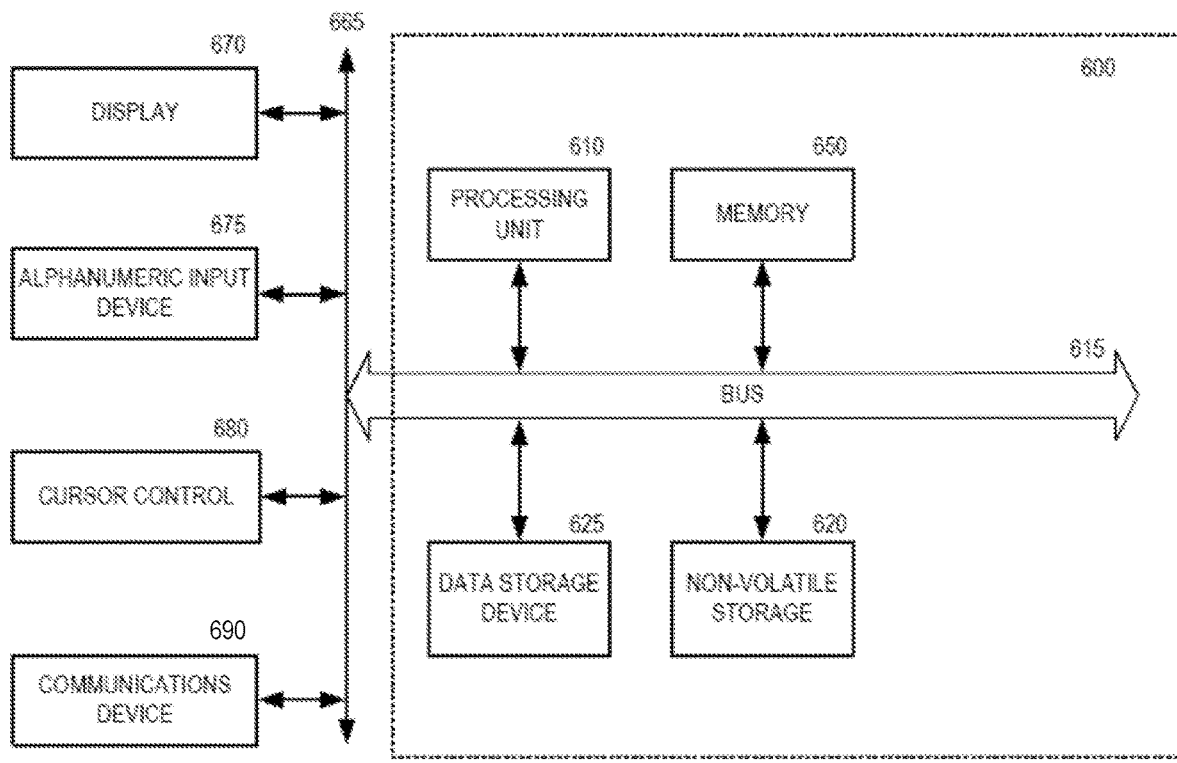
FIG. 6 is one embodiment of a computer system that may be used to support the systems and operations discussed herein.

FIG. 6 is one embodiment of a computer system that may be used to support the systems and operations discussed herein. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
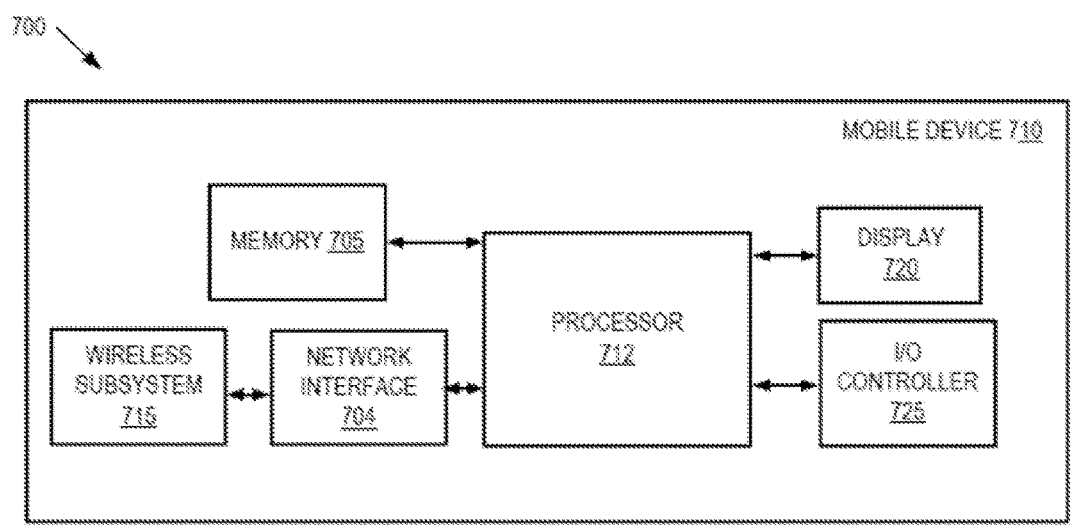
FIG. 7 is one embodiment of a mobile device that may be used to support the systems and operations discussed herein.

FIG. 7 is block diagram of one embodiment 700 of a mobile device. Mobile device 710 provides additional details for mobile devices discussed above in FIGS. 1 and 2.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for improving speed and reducing network latency associated with multi-factor authentication usage by generating, on behalf of a user device, at least a part of multi-factor authentication information for a current authentication request in accordance with earlier monitored data associated with execution of an earlier authentication request, without requiring user input pertaining to the generated part of multi-factor authentication information to be entered or obtained from the user device across a network, the method comprising:

monitoring, by one or more processors of a server system and at a first time, data associated with execution of a first authentication request for an electronic device,
the first authentication request being the earlier authentication request, and
the user device being the electronic device;

receiving, by the server system and at a second time, a request to complete a second authentication request that is requested for an electronic transaction requested by the electronic device, the second authentication request being the current authentication request;

determining, by the server system, that the second authentication request is associated with a multi-factor authentication requirement for at least a first factor authentication information associated with a first factor requirement and a second factor authentication information associated with a second factor requirement;

identifying, by the server system, the first factor authentication information received during the electronic transaction;

generating, by the server system, based on determining that the second authentication request is associated with the multi-factor authentication requirement, and based on the monitored data, associated with execution of the first authentication request, being entered during a same browsing session, the second factor authentication information in accordance with the monitored data associated with execution of the first authentication request,
the second factor authentication information satisfying the second factor requirement, and
the second factor authentication information being the generated part of multi-factor authentication information;

generating an expiring universal resource locator (URL) that expires after a period of time has passed;

storing the second factor authentication information in a storage location accessible by the expiring URL; and transmitting, by the server system and in connection with the second authentication request, an electronic message comprising:
the first factor authentication information, and
the expiring URL for retrieval of the second factor authentication information from the storage location.

2. The method of claim 1, wherein the expiring URL is transmitted within one or more input fields.

3. The method of claim 1, further comprising:
encrypting the second factor authentication information; and
transmitting an encryption key for decrypting of the second factor authentication information.

4. The method of claim 1, wherein the first factor authentication information comprises a card number, a personal identification number, a card security code, an expiration data, a username and password, or a combination thereof.

5. The method of claim 1, wherein the second factor authentication information comprises a transaction history of a user of the user device, a device identification of the user, a passcode received from the user in association with a prior transaction, or a combination thereof.

6. The method of claim 5, wherein the passcode received from the user comprises a one-time password.

7. The method of claim 1, wherein the multi-factor authentication requirement comprises a three-dimensional secure (3DS) protocol.

8. One or more non-transitory computer-readable storage media including instructions that, when executed by a processor of a server system, causes the server system to:
monitor, at a first time, data associated with execution of a first authentication request for an electronic device;
receive, at a second time, a request to complete a second authentication request that is requested for an electronic transaction requested by the electronic device;
determine that the second authentication request is associated with a multi-factor authentication requirement for at least a first factor authentication information associated with a first factor requirement and a second factor authentication information associated with a second factor requirement;
identify the first factor authentication information received during the electronic transaction;
generate, based on determining that the second authentication request is associated with the multi-factor authentication requirement and based on the monitored data being entered during a same browsing session, the second factor authentication information in accordance with the monitored data and without requiring user input pertaining to the second factor authentication information to be entered or obtained from across a network, the second factor authentication information satisfying the second factor requirement;
generate an expiring universal resource locator (URL) that expires after a period of time has passed;
store the second factor authentication information in a storage location accessible by the expiring URL; and
transmit, in connection with the second authentication request, an electronic message comprising:
the first factor authentication information, and
the expiring URL for retrieval of the second factor authentication information from the storage location.

9. The one or more non-transitory computer-readable storage media of claim 8, wherein the expiring URL is transmitted within one or more input fields.

10. The one or more non-transitory computer-readable storage media of claim 8, wherein the instructions further cause the server system to:
encrypt the second factor authentication information; and
transmit an encryption key for decrypting the second factor authentication information.

11. The one or more non-transitory computer-readable storage media of claim 8, wherein the first factor authentication information comprises a card number, a personal identification number, a card security code, an expiration data, a username and password, or a combination thereof.

12. The one or more non-transitory computer-readable storage media of claim 8, wherein the second factor authentication information comprises a transaction history of a user of the electronic device, a device identification of the electronic device, a passcode received from the user in association with a prior transaction, or a combination thereof.

13. The one or more non-transitory computer-readable storage media of claim 12, wherein the passcode received from the user comprises a one-time password.

14. The one or more non-transitory computer-readable storage media of claim 8, wherein the multi-factor authentication requirement comprises a three-dimensional secure (3DS) protocol.

15. A computer system comprising:
memory; and
one or more processors, coupled to the memory, configured to:
monitor, at a first time, data associated with execution of a first authentication request for an electronic device;
receive, at a second time, a request to complete a second authentication request that is requested for an electronic transaction requested by the electronic device;
determine that the second authentication request is associated with a multi-factor authentication requirement for at least a first factor authentication information associated with a first factor requirement and a second factor authentication information associated with a second factor requirement;
identify the first factor authentication information received during the electronic transaction;
generate, based on determining that the second authentication request is associated with the multi-factor authentication requirement and based on the first authentication request being entered during a same browsing session, the second factor authentication information in accordance with the monitored data associated with execution of the first authentication request and without requiring user input pertaining to the second factor authentication information to be entered or obtained from across a network, the second factor authentication information satisfying the second factor requirement; and
generate an expiring universal resource locator (URL) that expires after a period of time has passed;
store the second factor authentication information in a storage location accessible by the expiring URL; and
transmit, in connection with the second authentication request, an electronic message comprising:
the first factor authentication information, and
the expiring URL for retrieval of the second factor authentication information from the storage location.

16. The computer system of claim 15, wherein the expiring URL is transmitted within one or more input fields.

17. The computer system of claim 15, wherein the first factor authentication information comprises a card number, a personal identification number, a card security code, an expiration data, a username and password, or a combination thereof.

18. The computer system of claim 15, wherein the second factor authentication information comprises a transaction history of a user, a device identification, a passcode received from the user in association with a prior transaction, or a combination thereof.

19. The computer system of claim 15, wherein the one or more processors are further configured to:
encrypt the second factor authentication information.

20. The computer system of claim 19, wherein the one or more processors are further configured to:
transmitting an encryption key for decrypting of the second factor authentication information.

* * * * *